W. NEWELL.
Coffee Cleaner.
No. 18,552.
Patented Nov. 3, 1857.
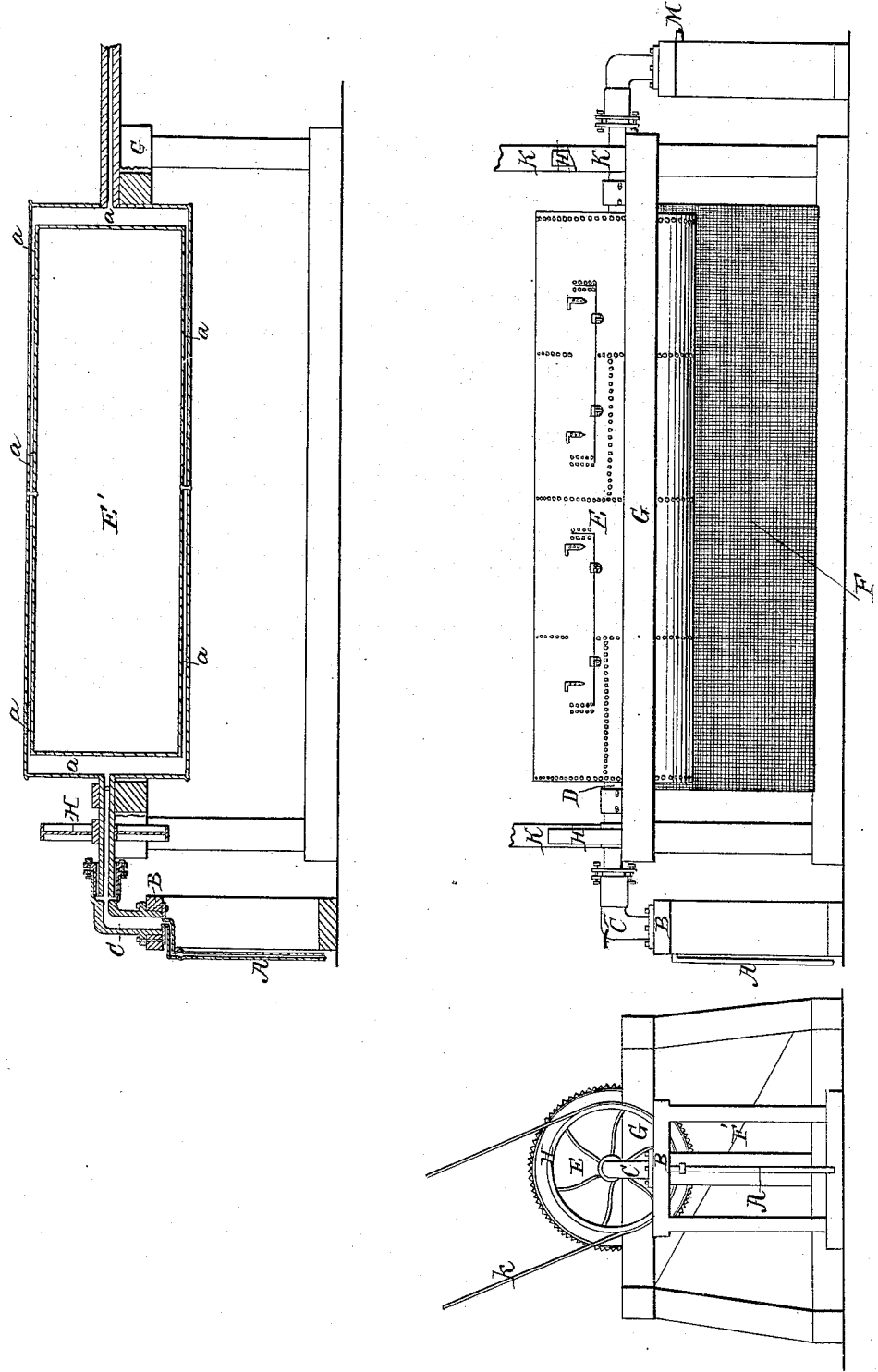

UNITED STATES PATENT OFFICE.

WM. NEWELL, OF PHILADELPHIA, PENNSYLVANIA.

METHOD OF CLEANING AND POLISHING COFFEE.

Specification of Letters Patent No. 18,552, dated November 3, 1857.

*To all whom it may concern:*

Be it known that I, WILLIAM NEWELL, of the city of Philadelphia and State of Pennsylvania, have invented a new and useful Improvement in Cleaning and Polishing Coffee; and I do hereby declare the following to be a full, clear, and exact description thereof, and of a machine which I have found by experiment to answer the purpose intended, reference being had to the accompanying drawings, making a part of this specification, in which—

Figure 1 represents a front elevation of the machine. Fig. 2 represents a central longitudinal and vertical section through the same, and Fig. 3 represents an end view.

Similar letters of reference where they occur in the separate figures denote like parts of the machine in all of them.

A very large proportion of the coffee imported into the United States, is found to be mixed with many impurities which are injurious, not only in its use, but to its marketable value. I have devised a means of cleaning such coffee of its impurities, without the least injury to its quality. And my invention consists in subjecting the coffee to dry heat, motion, and friction at the same time, by which means it is cleaned of its impurities, and polished—the impurities being separated from the coffee by a screen in connection with the cleaning and polishing.

Now I am aware that, a cylinder with a surrounding steam jacket, has been used for many purposes. I make no claim to the apparatus herein described, but merely represent it to better illustrate my process of treating green coffee, and which process constitutes the essence of my invention. Grains, flour, and many other articles have been subjected to heat and motion and friction, in a cylinder, such as I represent. To this I lay no claim, nor to the treatment of anything but coffee. And I am not aware that coffee has ever been cleaned and polished in the way which I have discovered.

To enable others skilled in the art to practice and use my process, I will proceed to describe a machine which I have found in practice to answer the purpose effectually.

E, represents an outer, and E', an inner cylinder, having steam space *a* between them. To the heads of the outer cylinder are secured hollow journals D; and on one or both of said journals a pulley H, is placed around which and around a pulley connected to any first moving power, is passed a belt or band K, to give motion to the cylinders. These journals run in properly arranged boxes placed on a table or frame G.

N. O, represent doors for affording communication from the outside to the interior of the inner cylinder. There may be one, two, or more of these doors, and if found desirable a screen of woven wire or other material may be placed in the opening underneath the doors, and made removable, the object being to charge the inner cylinder with the coffee to be operated upon, and then close up the opening tight. When the cleaning and polishing is done, the outer doors may be swung open, and then by continuing the rotation of the cylinders, the impurities will be sifted out from the coffee, and pass through the screens.

A hollow elbow C, supported on a frame or table B, at the ends of the main frame, is connected to the hollow journals by a steam joint as shown in the figures, so that the journals may turn therein and be steam tight. The steam is introduced through the pipe A, which leads from a steam boiler, thence through the elbow C, and hollow journal D, at that end of the machine, into the steam space *a* between the inner cylinder and the outer one or its jacket, and after circulating through said steam space, it may pass off through the other hollow journal, elbow, and exit pipe M.

The operation is as follows: The cylinder being charged with coffee, and the steam introduced, motion is then given to the cylinders, and also to the coffee within the inner one. The heat from the circulating steam is imparted to the coffee partially drying it, while at the same time it is being rubbed and polished, by the friction between the rotating grains. The vapor from the coffee may escape through a suitable opening in the cylinders. And instead of steam hot air may be used and effect the same purpose. When the drying and polishing is finished, the coffee is thrown out upon the inclined screen F, and whatever impurities that have been loosened and remain in the coffee, is effectually screened out, by this screen.

Having thus fully described my process of treating green coffee, I would state that,

I do not lay any claim to the apparatus herein described, as it has been used for many purposes. But What I do claim as new and desire to secure by Letters Patent is, The cleaning and polishing of green coffee, by subjecting it to the combined action of heat, friction, and motion, as herein set forth and explained.

<div style="text-align:right">WM. NEWELL.</div>

Witnesses:
 ALEXANDER EASTON,
 M. O. B. KENNEY.